(12) United States Patent  
Cirit

(10) Patent No.: US 8,737,492 B1
(45) Date of Patent: May 27, 2014

(54) METHODS, SYSTEMS AND CIRCUITS FOR CANCELLING REFLECTIONS ON A CHANNEL

(75) Inventor: Halil Cirit, Burlingame, CA (US)

(73) Assignee: NetLogic Microsystems, Inc., Irvine, CA (US)

( * ) Notice: Subject to any disclaimer, the term of this patent is extended or adjusted under 35 U.S.C. 154(b) by 283 days.

(21) Appl. No.: 13/182,379

(22) Filed: Jul. 13, 2011

(51) Int. Cl.
H04B 3/00 (2006.01)
H04L 25/03 (2006.01)

(52) U.S. Cl.
USPC .......................................... 375/257; 375/296

(58) Field of Classification Search
USPC ..................... 375/257, 295, 296, 316, 340; 455/114.1, 114.2, 114.3
See application file for complete search history.

(56) References Cited

U.S. PATENT DOCUMENTS

| | | | |
|---|---|---|---|
| 3,601,543 A | 8/1971 | Maniere et al. | |
| 5,519,342 A | 5/1996 | McEwan | |
| 6,167,467 A | 12/2000 | Itoh et al. | |
| 6,242,990 B1 | 6/2001 | Sokolov | |
| 6,384,622 B2 * | 5/2002 | Verhaeghe et al. | 326/30 |
| 6,654,591 B1 * | 11/2003 | Hoffmann | 455/114.1 |
| 6,961,546 B1 | 11/2005 | Rofougaran et al. | |
| 7,373,114 B2 * | 5/2008 | Yagyu et al. | 455/78 |
| 7,436,900 B2 * | 10/2008 | Hoffmann | 375/296 |
| 7,941,105 B1 * | 5/2011 | McCall et al. | 455/114.2 |
| 7,974,799 B2 * | 7/2011 | Izumi | 702/69 |
| 2009/0225900 A1 * | 9/2009 | Yamaguchi et al. | 375/296 |
| 2009/0252212 A1 * | 10/2009 | Risk et al. | 375/231 |

OTHER PUBLICATIONS

U.S. Appl. No. 10/176,495, filed Jun. 21, 2002, Sidiropoulos et al., Office Action dated Mar. 30, 2011.
U.S. Appl. No. 11/930,978, filed Oct. 31, 2007, Sidiropoulos et al., Office Action dated Mar. 18, 2011.
U.S. Appl. No. 10/176,495, filed Jun. 21, 2002, Sidiropoulos et al., Office Action dated Oct. 14, 2011.

* cited by examiner

Primary Examiner — Khanh C Tran
(74) Attorney, Agent, or Firm — Sterne, Kessler, Goldstein & Fox P.L.L.C.

(57) ABSTRACT

Methods, systems, and circuits cancel a reflection on a channel. A main signal conditioning module improves the quality of a signal for transmission on a channel. In addition, a reflection cancellation module generates a signal that cancels reflections generated on the channel in order to improve the quality of the transmitted signal for a receiver. A summer combines an output signal from the main signal conditioning module and the reflection cancellation module.

21 Claims, 16 Drawing Sheets

METHODS, SYSTEMS AND CIRCUITS FOR CANCELLING REFLECTIONS ON A CHANNEL

BACKGROUND

1. Field

The present disclosure is related to the field of communications, and more particularly to generating high signal quality across networks and over a wide range of frequencies.

2. Art Background

Communication systems use channels, or physical mediums, to transport signals among multiple points. For example, physical mediums or channels are used to carry signals in networks, including over wide area and local networks. One important design criteria in communication systems is to maintain a high signal quality throughout the network. One aspect of maintaining signal quality is to ensure signals are not degraded as they are propagated through the channels and physical mediums.

The channel may be characterized through its characteristic impedance. For example, some channels may exhibit a characteristic impedance of 50 ohms. The characteristic impedance is measured as both a real (resistive) impedance and an imaginary (reactive) impedance. The reactive impedance is a function of inductance and capacitance on the channel. As such, the reactive impedance component is frequency dependent. Therefore, if a channel transmits signals across a wide range of frequencies, the characteristic impedance of the channel changes across those frequencies.

In network systems, the physical mediums are designed and built to interface with other aspects of the network by matching the characteristic impedance of the channel to the impedances of the channel interfaces. To this end, designers attempt to provide, for signal transmission, a constant characteristic impedance for the physical medium across a range of frequencies. However, it is difficult to provide a constant characteristic impedance across the channel for all frequencies. Mismatches, due to frequency variations, the physical connections, imperfections in the channel, etc., result in imperfect channels that degrade signal quality. A mismatched channel generates signal reflections in the channel that degrade the quality of the signal and cause data dependent jitter, which is a form of inter symbol interference. As such, it is desirable to eliminate or minimize signal reflections on the channel in order to improve the quality of the communications system.

The methods, circuits and systems of the present disclosure provide means for generating high quality signals across physical mediums and interfaces.

BRIEF DESCRIPTION OF THE DRAWINGS

Novel features are set forth in the appended claims. However, for purpose of explanation, several embodiments are set forth in the following figures.

DETAILED DESCRIPTION

A channel, as defined herein, connotes any type of physical medium for carrying signals from a source (e.g., transmitter) to one or more destinations (e.g., receiver(s)). For example, a physical medium for the channel may consist of copper, coaxial cable (Ethernet) or optical fiber (e.g., fiber channel). As discussed above, it is desirable to eliminate or minimize signal reflections on the channel in order to improve the quality of the communications systems. Those signal reflections contribute to data dependent jitter on the channel. In turn, data dependent jitter degrades performance of the communication system (i.e., errors occur at the receiver as a result of the data dependent jitter). However, near end and far end transmission mismatches are the main reason for excessive jitter. These mismatches, mostly caused by the capacitive or inductive characteristics of the channel, may result in errors when the signal is interpreted at the destination.

Figure 1:
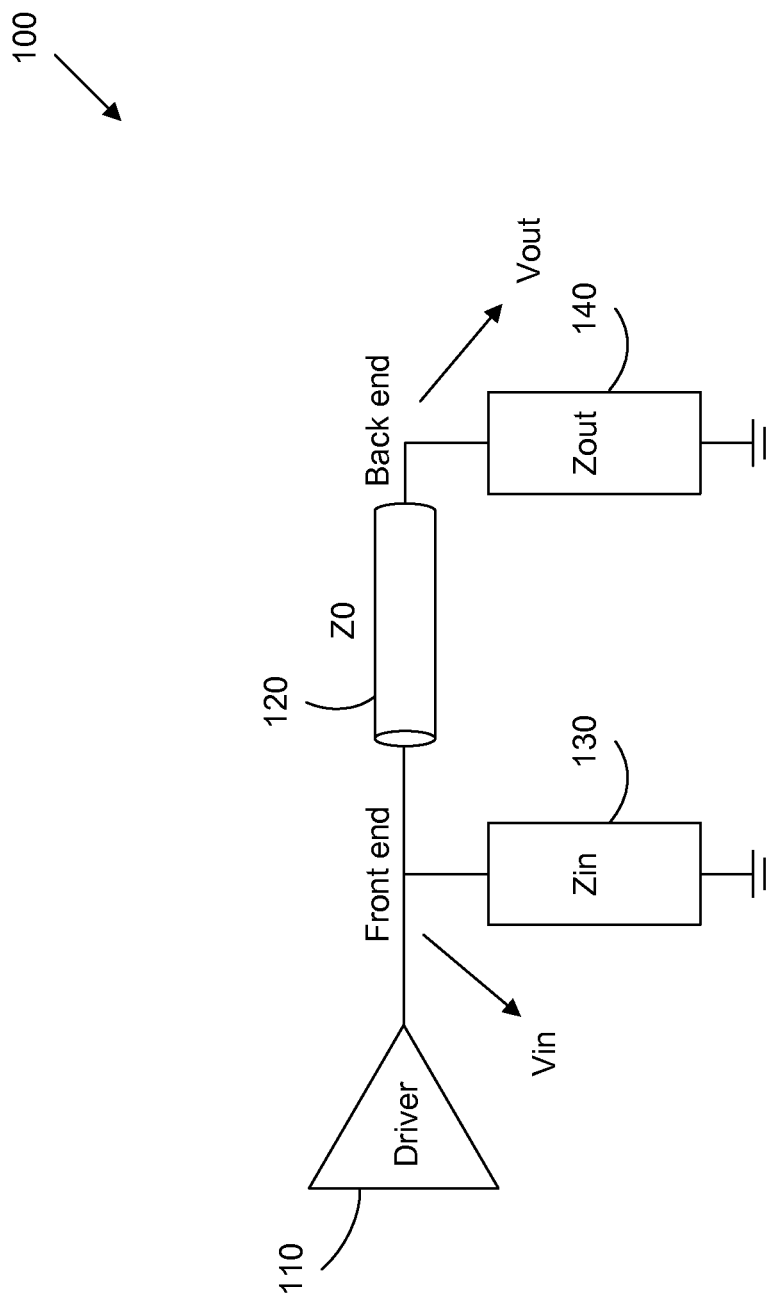
FIG. 1 illustrates a circuit model for determining the characteristic impedance for a communications system.

FIG. 1 illustrates a circuit model for determining the characteristic impedance for a communications system 100. The communications system 100 includes a driver 110, located on the source (e.g., transmitter), that transmits the waveform across the channel or transmission line 120. As shown in FIG. 1, transmission line 120 has a characteristic impedance of Z0. The model circuit 100 also shows an input impedance, Zin (130), and an output impedance, Zout (140). The quality of the signal, propagated through the physical medium 120, is dependent upon matching the characteristic impedance of the channel (120) with the input impedance 130 and the output impedance 140.

Figure 2:
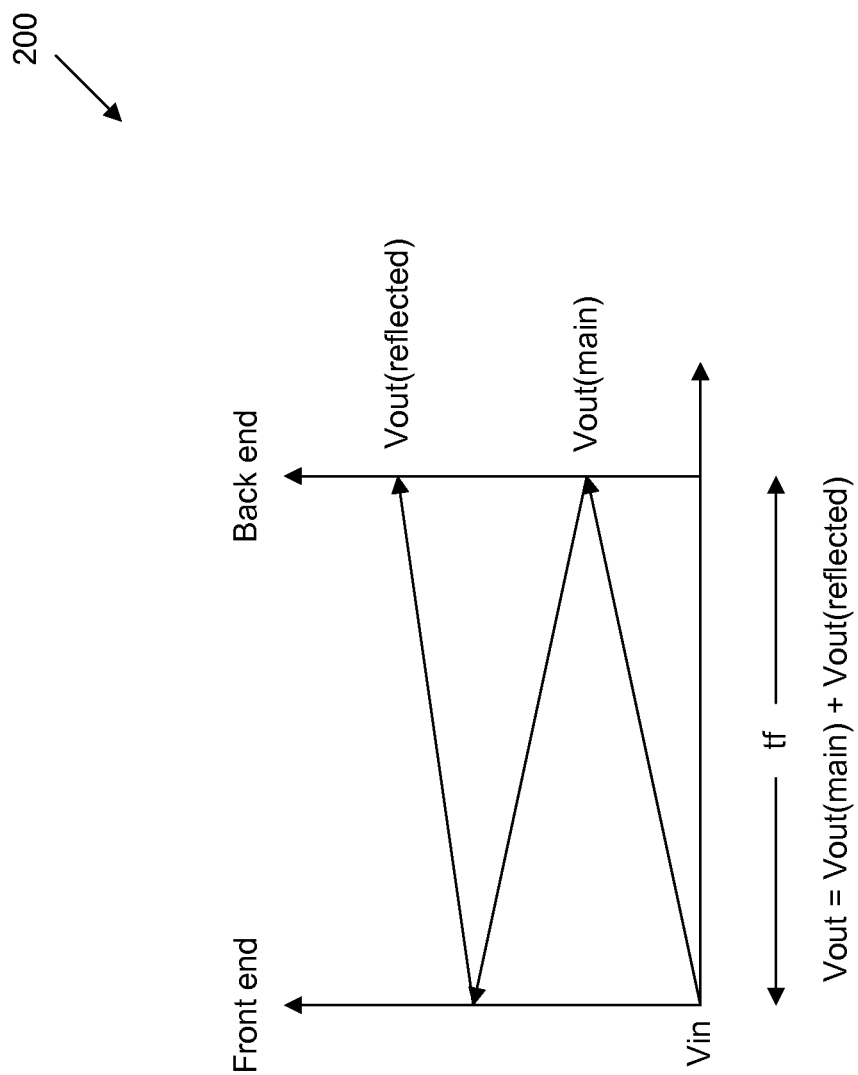
FIG. 2 is a chart that illustrates voltages at various points and at various times of the circuit model of FIG. 1.

FIG. 2 is a chart that illustrates voltages at various points and at various times of the circuit model of FIG. 1. The left end of chart 200 identifies the voltages at the input, Vin, and the right end of chart 200 identifies the voltages at the output, Vout, as referenced in FIG. 1. The horizontal axis of chart 200 depicts "time of flight" ("tf") between the input, Vin, and the output, Vout. As shown in chart 200, the voltage at the front end, starts at Vin, prior to transmission (e.g., zero time of flight). When the signal reaches the back end, after the first time of flight, the voltage value of Vin is increased to the level of Vout (main). In turn, after an additional time of flight (e.g., a second time of flight), the voltage value at the front end, which is a product of a reflected signal from the channel, is greater than the original voltage value, Vin. Then, through another time of flight (e.g., a third time of flight), an additional voltage value, Vout(reflected), is accumulated at the back end. As a result, the total voltage at the back end, Vout, equals a sum of Vout(main) and Vout(reflected).

Figure 3:
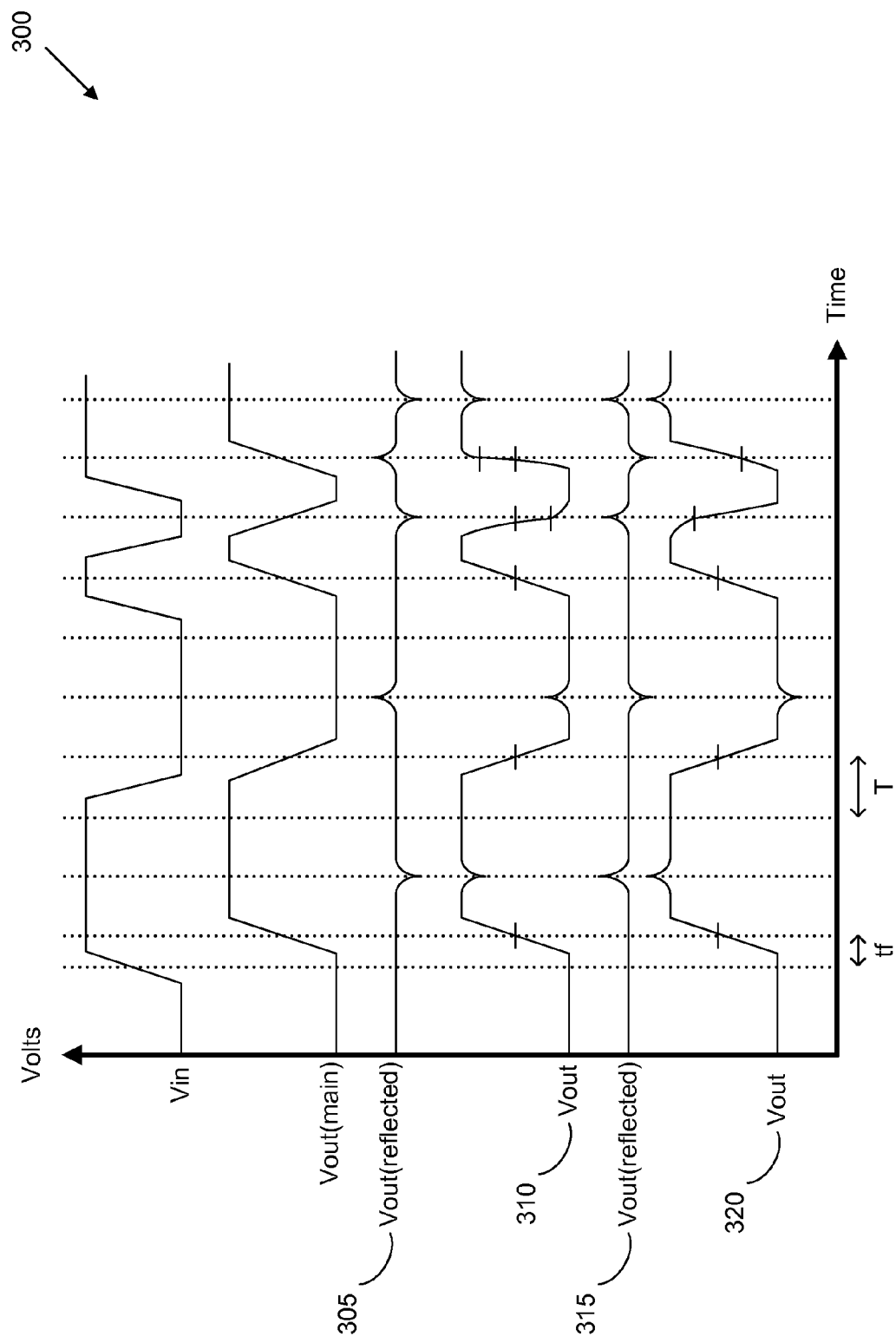
FIG. 3 illustrates waveforms, identified on the chart of FIG. 2, for the circuit model of FIG. 1.

FIG. 3 illustrates waveforms, identified on the chart of FIG. 2, for the circuit model of FIG. 1. As shown in the waveforms of FIG. 3, Vin, shown as the top waveform, represents the signal as output from the driver 110 (FIG. 1). Vout(main), shown as the second waveform from the top in FIG. 3, is delayed at the back end, relative to the Vin waveform, as a result of the time of flight. The Vout(reflected) signal 305 is shown as the third waveform from the top on FIG. 3. As shown in waveform Vout(reflected) 305, the reflected pulse on the channel alternates between a negative pulse and a positive pulse. As shown in FIG. 3, for this example data pattern, the Vout(reflected) 305 causes a subtraction from the high logic level of Vout(main) signal to create Vout 310. The Vout(reflected) signal 315 is shown as the fifth waveform from the top of FIG. 3, and for this example of Vout(reflected) 315, the reflected pulse on the channel alternates between a positive pulse and a negative pulse to create Vout 320. For example, for the first high voltage level of Vout 320, the Vout(reflected) 315 causes an addition to the high voltage level of Vout(main) signal to create Vout 320.

As seen in FIG. 3, jitter may be created if a reflected pulse arrives at a time corresponding to the rising edge or the falling edge of the Vout signal. For example, Vout 320 may comprise jitter as a Vout (reflected) signal 315 is received at a rising edge or a falling edge. As is evident, the Vout 320 experiences a deviation or displacement in the signal due to the Vout (reflected) signal 315 arriving at either the rising edge or the falling edge of Vout 320. As such, Vout 320 may only experience jitter in response to the Vout(reflected) signal 315 pulse arriving at the rising edge or falling edge. However, no such jitter is created in Vout 320 if the Vout(reflected) signal 315 pulse arrives at the middle of a data pattern of Vout 320. As such, in some embodiments, a reflection cancellation pulse may be optimized to arrive at the middle of the rising edge or the falling edge of the data, as described in further detail below. As such, if a reflection arrives in the middle of a data pattern of Vout 320, the reflection may be ignored as it would not create jitter within Vout 320.

Figure 4:
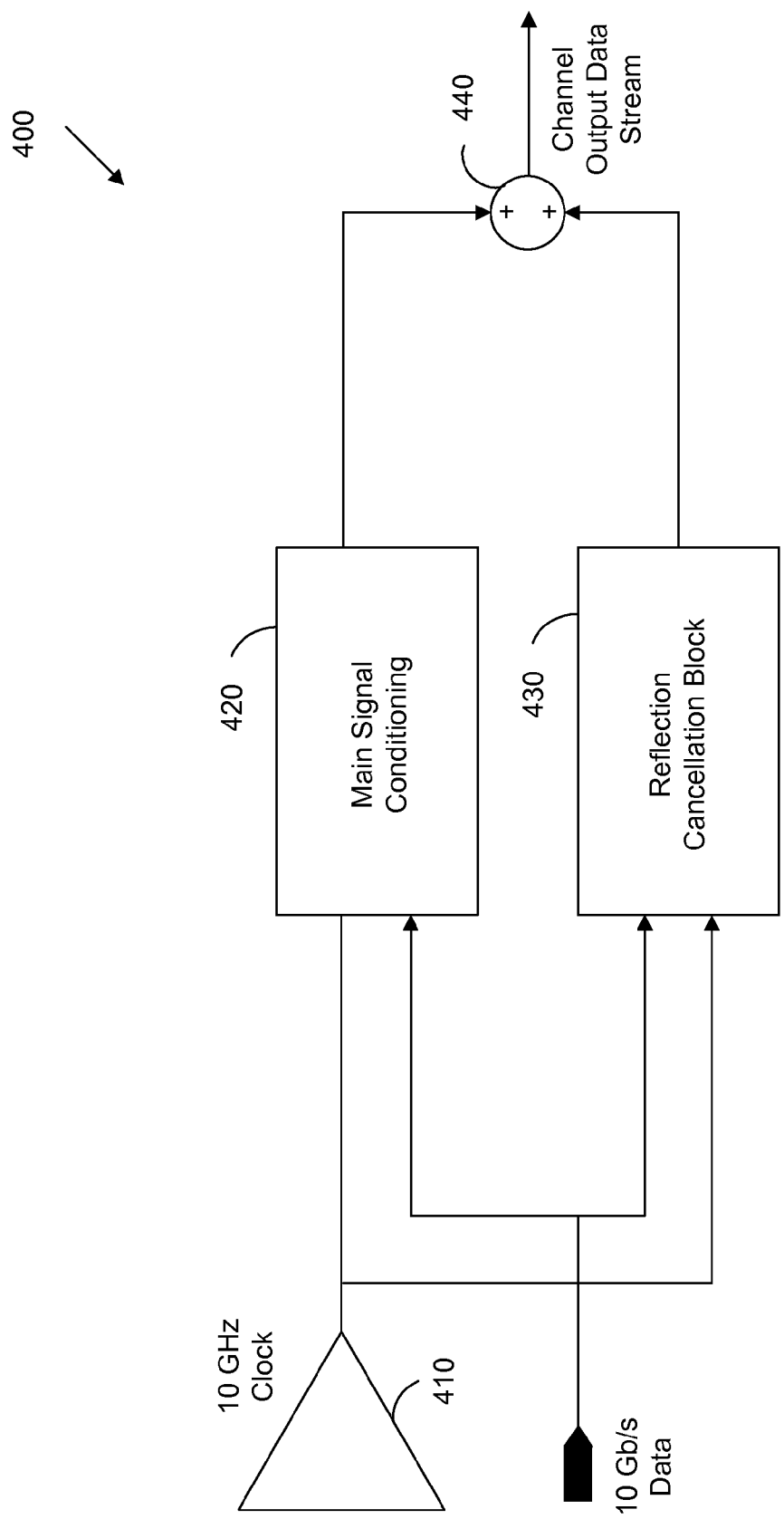
FIG. 4 is a block diagram illustrating one embodiment for a signal conditioning circuit that includes reflection cancellation.

FIG. 4 is a block diagram illustrating one embodiment for a signal conditioning circuit that includes reflection cancellation. For this embodiment, the system 400 includes a main signal conditioning block 420 and a reflection cancellation block (430). As shown in FIG. 4, a clock 410 is input to main signal conditioning 420 and reflection cancellation block 430. For example, the system operates on a 10 GHz clock. Data (e.g., 10 Gb/s stream) is also input to main signal conditioning 420 and reflection cancellation block 430. In general, main signal conditioning 420 increases and improves the quality of the signal for transmission on a channel or medium. As set forth below, in some embodiments, main signal conditioning may comprise a half-tap circuit or a full tap circuit used to condition the data stream for transmission on a channel or medium. However, any data signal conditioning circuit, which improves a signal for transmission, may be used. The reflection cancellation block 430 generates a signal that cancels reflections, generated on the channel or medium, to improve the quality of the data stream for the receiver. The conditioned main signal, output from main signal conditioning 420 and the reflection cancellation signal, generated from the reflection cancellation block 430, are combined in summer 440. The resultant (or combined) signal, output from summer 430, is labeled "channel output data stream" in FIG. 4.

Figure 5:
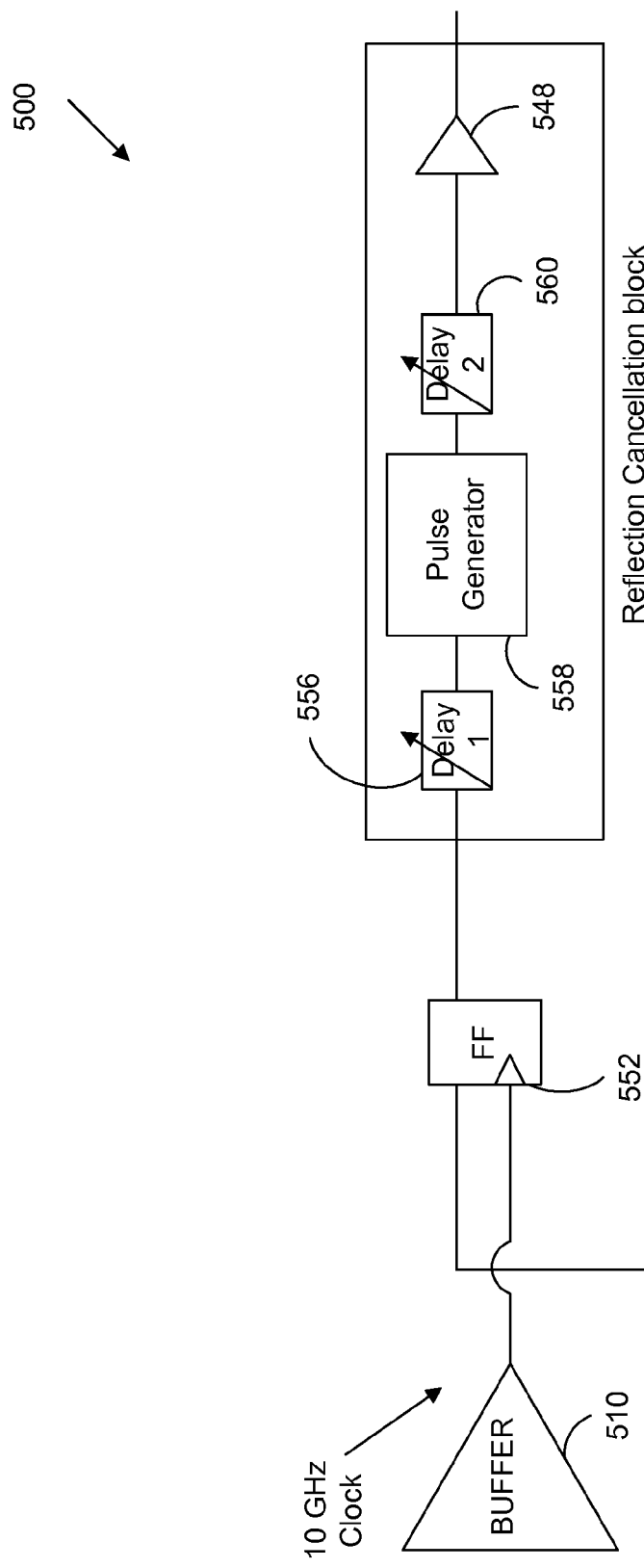
FIG. 5 is a block diagram illustrating one embodiment for a reflection cancellation block.

FIG. 5 is a block diagram illustrating one embodiment for a reflection cancellation block. The reflection cancellation circuit 500 receives a clock, from buffer 510, and a serial data stream (e.g., a 10 Gb per second data stream). As shown in FIG. 5, the clock and data stream are input to a flip flop 552. In general, the flip flop 552 may be used to retime the data. For example, the flip flop 552 may retime or give a one unit interval (UI) shift to the data.

Figure 14:
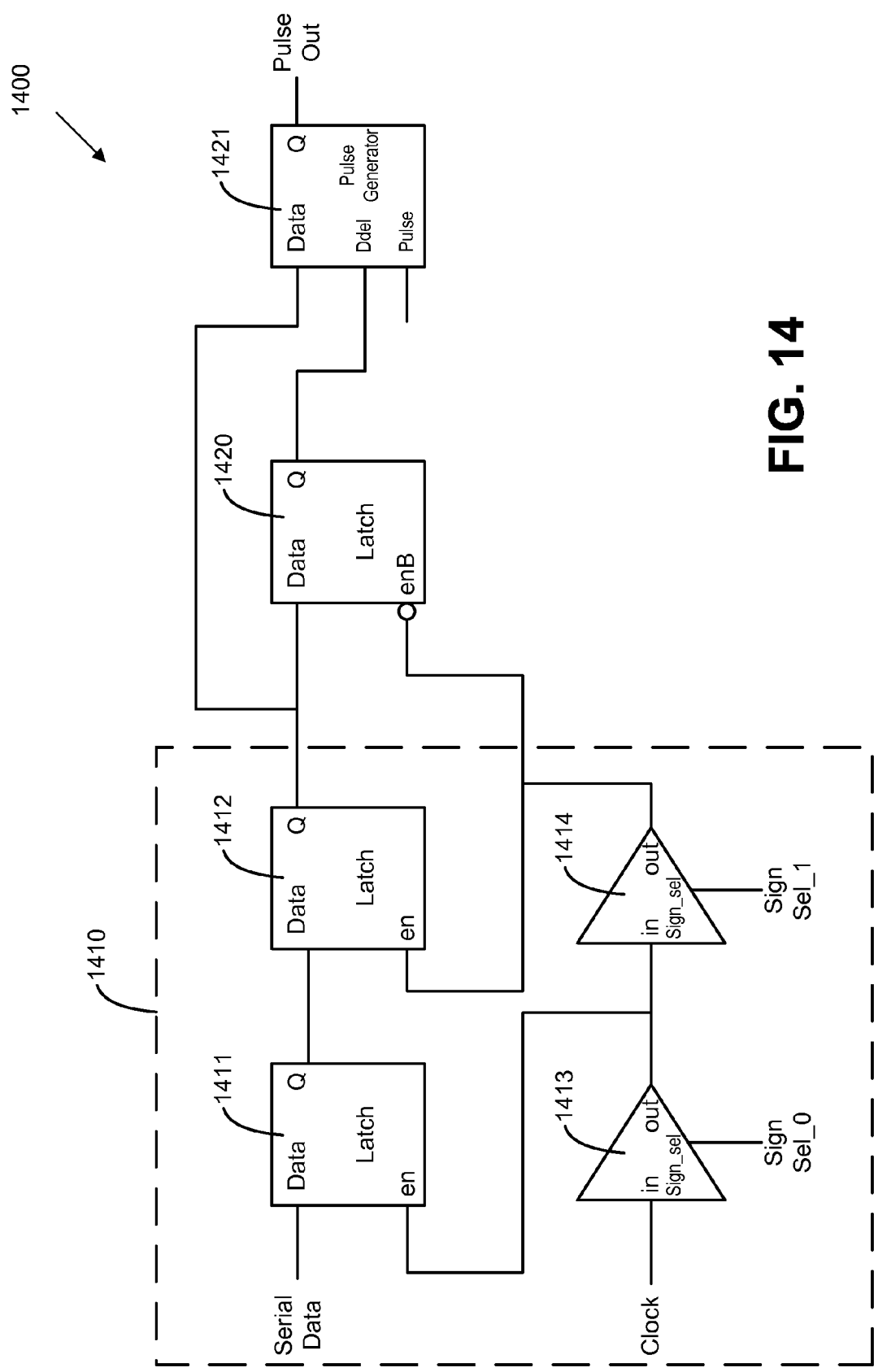
FIG. 14 illustrates an embodiment of delay circuits used in accordance with some embodiments.

The output of flip flop 552 is input to the reflection cancellation block 550. For this embodiment, reflection cancellation block 550 comprises delay1 556, pulse generator 558, delay2 560 and a driver or buffer 548. In operation, the delay1 556 defines a pulse width for the signal appropriate to cancel the reflection signal in the channel and the delay2 560 introduces additional delay. In some embodiments, the amount of delay introduced by delay2 matches twice the time of flight (i.e., the time for the signal to travel from the transmitter to the receiver over the channel). However, in some embodiments, the matching of twice the time of flight is not exact. For example, if twice the time of flight is 2.1 unit intervals or 1.9 unit intervals, the delay introduced by delay2 may comprise 2 unit intervals. As such, approximate multiples of the period are used. The signal is then input to pulse generator 558. In general, pulse generator 558 generates a positive or negative pulse, depending upon a rising or falling edge of the clock. In some embodiments, the pulse generator 558 receives and/or stores a control bit for generating a pulse on the rising or falling edge of the clock. As such, the pulse generator may generate a positive pulse for a rising edge and a negative pulse for a falling edge or a negative pulse for a rising edge and a positive pulse for a falling edge. The output pulse of the pulse generator 558 is input to delay2 560. The delay2 560 may then position the pulse relative to twice the time of flight. While delay1 556, pulse generator 558, and delay2 560 are shown arranged in a particular order in the reflection cancellation block 550, the order of these elements may be varied, as illustrated in FIG. 14 in accordance with one example.

Figure 6:
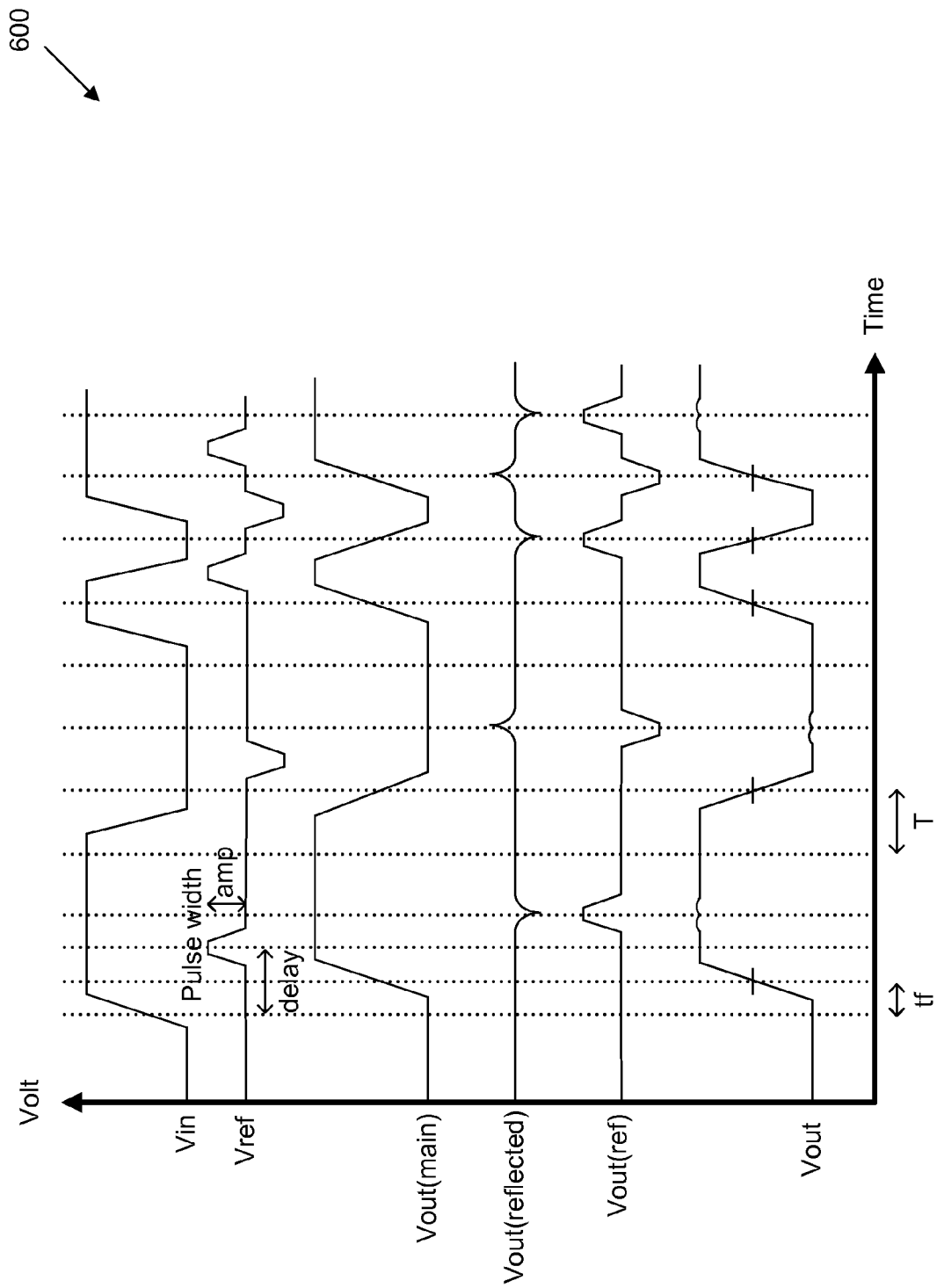
FIG. 6 is a signal diagram that illustrates signals generated in accordance with one embodiment of the reflection cancellation technique.

FIG. 6 is a signal diagram that illustrates signals generated in accordance with one embodiment of the reflection cancellation technique. $V_{in}$, shown as the top signal in FIG. 6, represents as example waveform output from a transmitter (e.g., the output of main signal conditioning (420 in FIG. 4). The second waveform of FIG. 6, labeled Vref, represents a waveform output from a reflection cancellation block (e.g., reflection cancellation block 430 and/or 550) in accordance with the example Vin waveform. The "delay", "pulse width" and "amplitude", parameters of the second waveform output from the reflection cancellation block, are labeled on FIG. 6. The Vout(main) signal, illustrated in FIG. 6, illustrates a waveform at the back end, after time of flight, for the example Vin waveform. The Vout(reflected) signal, which represents the reflected signal at the back end (see FIG. 2), is shown in FIG. 6. The reflection cancellation substantially cancels the effect of Vout(reflected) at the backend (e.g., receiver). The Vref signal, generated at the output of the transmitter or input to the channel, becomes the Vout(ref) signal at the back end of the channel and at a time Vout(reflected) is generated. As such, Vout(ref) and Vout(reflected) are combined with a Vout (main) signal at the back end, during a time shown in FIG. 2, to generate the resultant Vout signal. As shown in the resultant Vout signal, the Vout(reflected) pulse is substantially cancelled by the Vout(ref) pulse at the receiver. In addition, in some embodiments, the reflection cancellation block technique only evaluates and cancels pulses injected on the signal at the data transition points. As such, the reflected signals (e.g., Vout(ref)) are detected only if the reflected pulses are occurring at the data transition. This results in a higher-quality signal because signals in this range affect the jitter of the data signal.

Figure 7:
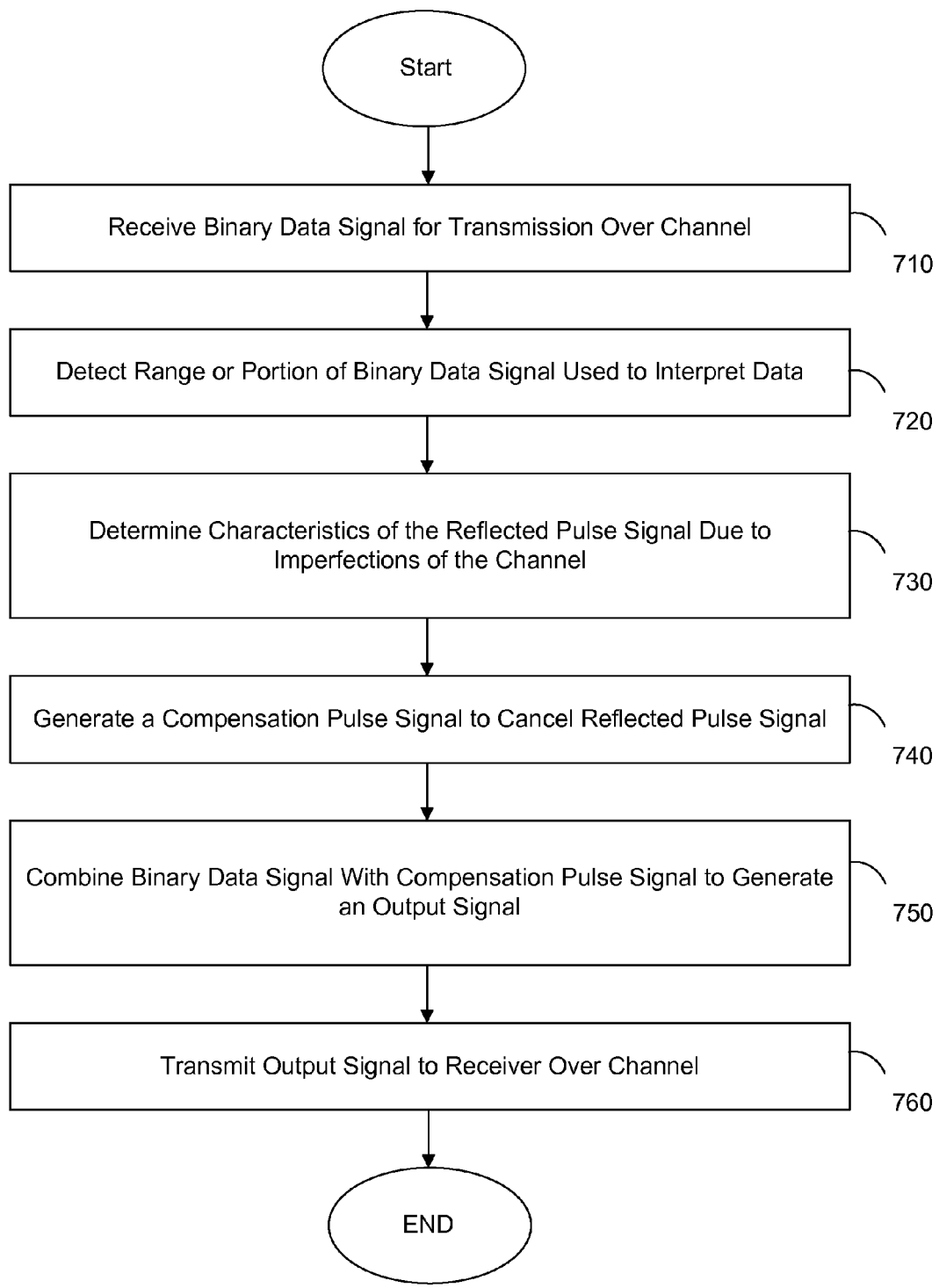
FIG. 7 is a flow diagram illustrating one embodiment for pulse reflection cancellation.

FIG. 7 is a flow diagram illustrating one embodiment for pulse reflection cancellation. As shown in block (710), a data signal (e.g., a binary data signal) is received at a transmitter for transmission over a channel (e.g., transmission line 120). Then, the technique detects the range or portion of the binary signal used to interpret the data (720). For example, if the system uses the middle of a clock (e.g., one half clock cycle) to determine whether the data signal is a high logic level or lower logic level, then this constitutes the portion of the binary signal used to interpret the data. The technique determines the characteristics of the reflected pulse signal due to imperfections of the channel (730). In general, knowledge of the channel, including mismatches, allows circuits and systems to generate reflection pulse(s) (e.g., Vout(ref), FIG. 6) that compensate for those imperfections in the channel. Using this information, a reflection compensation signal to at least partially (e.g., to substantially) cancel the reflected pulse signal is generated (740) (e.g., by cancellation block 430/550, FIGS. 4-5). The reflection compensation signal is then combined with the binary data signal (e.g., by combiner 440, FIG. 4) to generate an output signal suitable for transmission over the channel 750. Thereafter, the resultant signal (binary data signal plus reflection compensation signal) is transmitted over the channel to the receiver 760.

Figure 8:
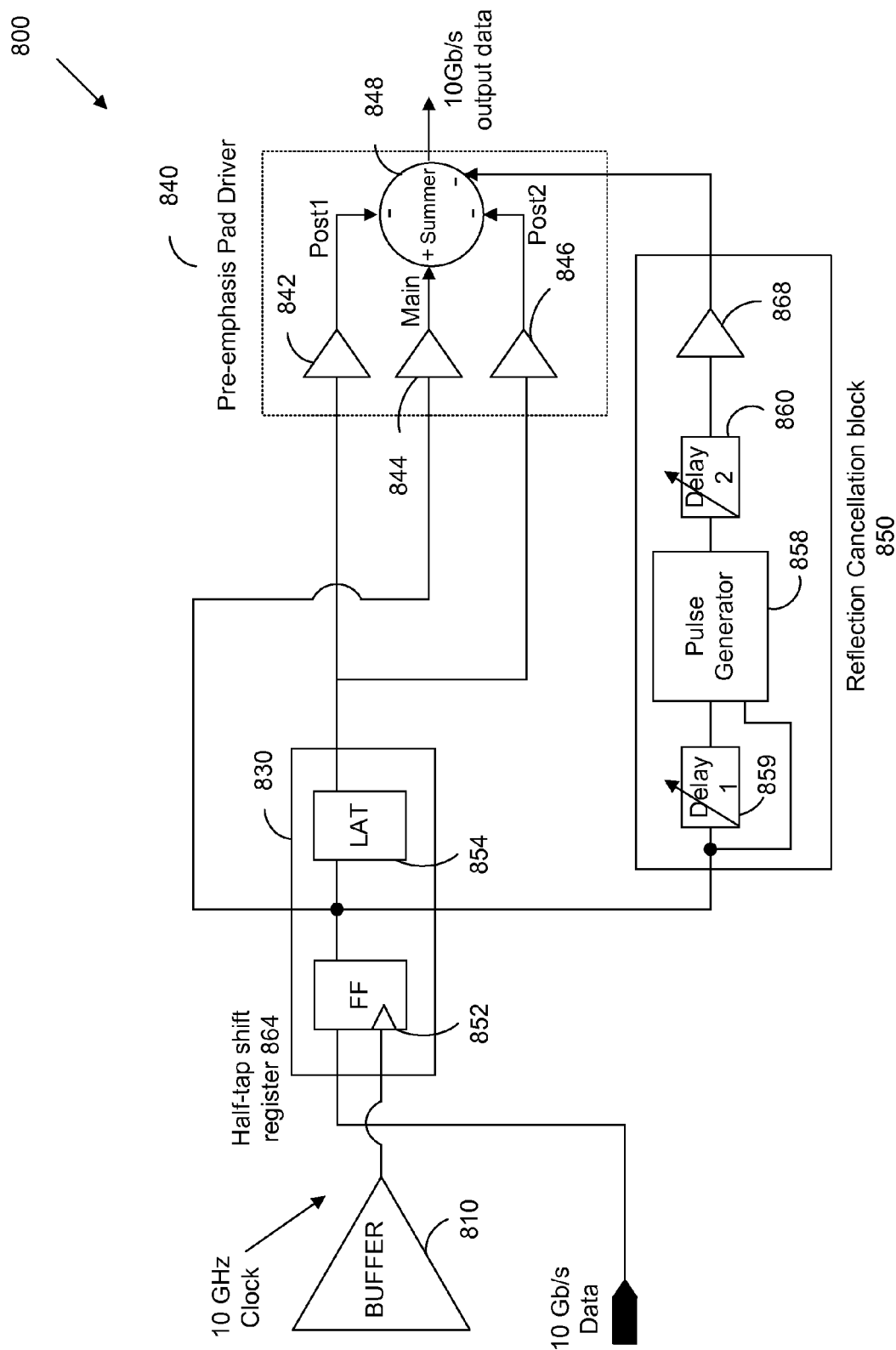
FIG. 8 illustrates a half-tap FIR circuit with a refection cancellation block configured in accordance with some embodiments.

FIG. 8 illustrates a half-tap FIR circuit 800 with a refection cancellation block configured in accordance with some embodiments. In general, the half-tap FIR circuit 800 generates an output data stream that cancels the first pole effect exhibited by the transmission channel. For the embodiment of FIG. 8, a half-tap shift register 864 incldes flip-flop 852 and latch 854. A clock, generated by buffer 810, is input to the clock input of flip-flop 852. In one embodiment, the clock is a 10 GHz clock, and the input data stream is a 10 Gb/s data stream. However, the half-tap FIR circuit 800 has application for a wide range of data rates. During each clock cycle, a serial input data stream is input to flip-flop 852. During the next clock cycle, the data output of flip-flop 852 is input to latch 854. In addition, the data output of flip-flop 852 is input to reflection cancellation block 850. As discussed above, reflection cancellation block 850 (comprising a delay1 859, pulse generator 858, delay2 860 and driver 868) generates a cancellation pulse signal to cancel a reflection pulse originating on the channel. Furthermore, the output of flip-flop 852 is designated as the main data signal. Latch 854 outputs data to generate two post-cursor signals. The post-cursor signals and main data signal are input to drivers (842, 846 and 844) respectively, and subsequently input to summer circuit 848. The output of reflection cancellation block 850 is also input to summer circuit 848. As shown in FIG. 8, summer circuit 848 subtracts the two post-cursor signals from the main signal to generate an output data stream. A pre-emphasis pad driver 840 may comprise the drivers 842, 844, and 846 and the summer circuit 848.

Figure 9:
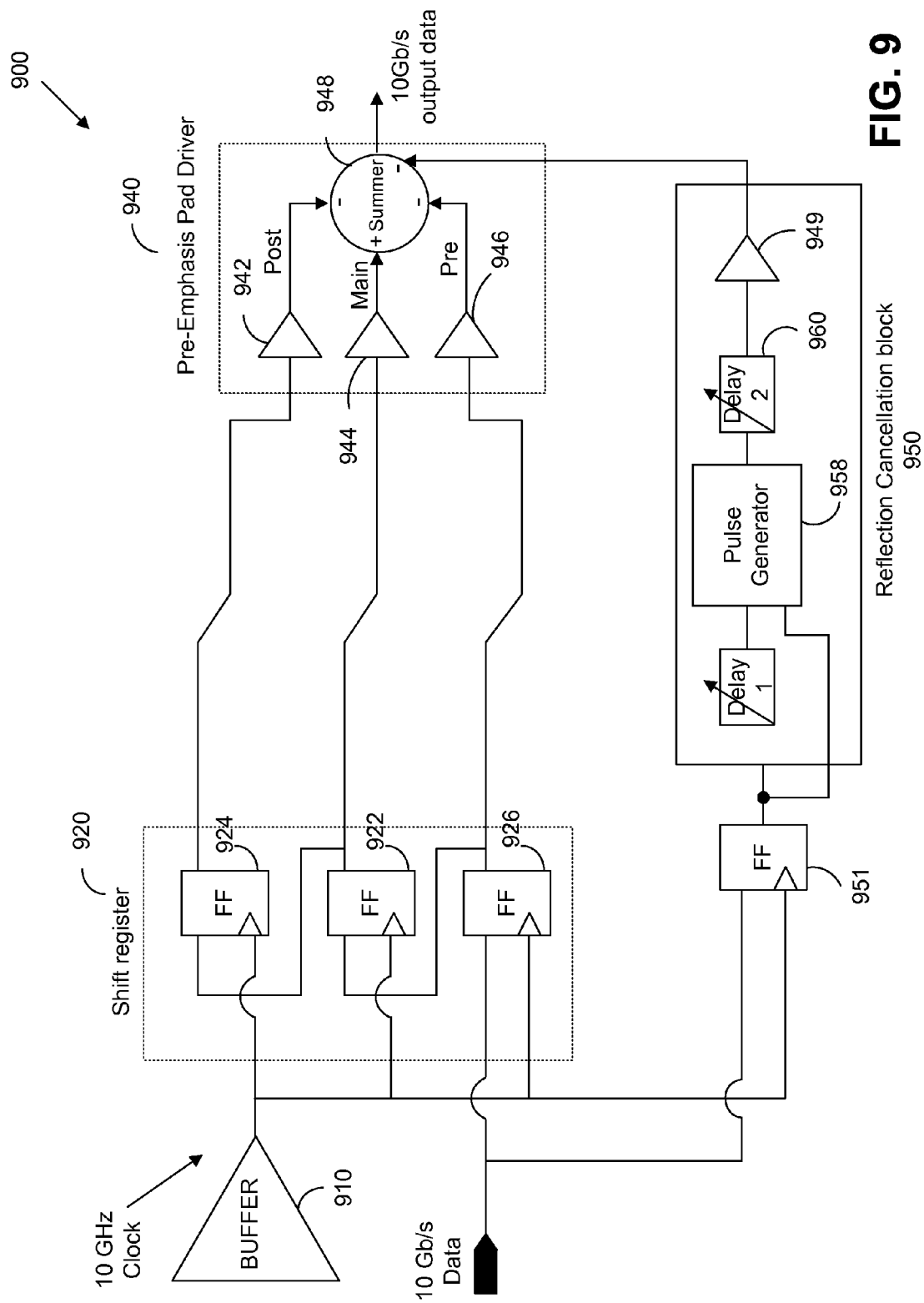
FIG. 9 illustrates one embodiment for a full-tap FIR circuit that incorporates a reflection cancellation block.

FIG. 9 illustrates one embodiment for a full-tap FIR circuit that incorporates a reflection cancellation block. As shown in FIG. 9, a clock (e.g., a 10 GHz clock) is input to the clock inputs of flip-flops 924, 922, 926 and 951. The flip-flops 924, 922, and 926 as coupled form a shift register 920. The input data stream (10 Gb/s) is input to the first flip-flop 926 of shift register 920 and to flip-flop 951. The output of flip-flop 926, which comprises the input data shifted one clock cycle, is input to summer circuit 948 as the pre-cursor data signal. Also, the output data signal from flip-flop 926 is the input data signal to flip-flop 922. The output of flip-flop 922, which comprises the data input one clock cycle prior, is designated as the main data signal. In addition, the data output of flip-flop 922 is input to the data input of flip-flop 924. The output of flip-flop 924, which comprises its data input one clock cycle later, is designated as the post cursor signal.

As shown in FIG. 9, data output from flip-flop 951 is input to reflection cancellation block 950. As discussed above, reflection cancellation block 950 (comprising delay1 959, pulse generator 958, delay2 960, and driver 949) generates a cancellation pulse signal to cancel a reflection pulse originating on the channel. The output of reflection cancellation block 950 is input to summer circuit 948. In addition, the main signal, post cursor signal and pre cursor signal are input to summer 948 through drivers 944, 942, and 946. As shown in FIG. 9, summer circuit 948 subtracts the post cursor and pre cursor signals and the reflection cancellation pulse from the main signal to generate an output data stream. A pre-emphasis pad driver 940 may comprise the drivers 942, 944, and 946 and the summer circuit 948.

Figure 10:
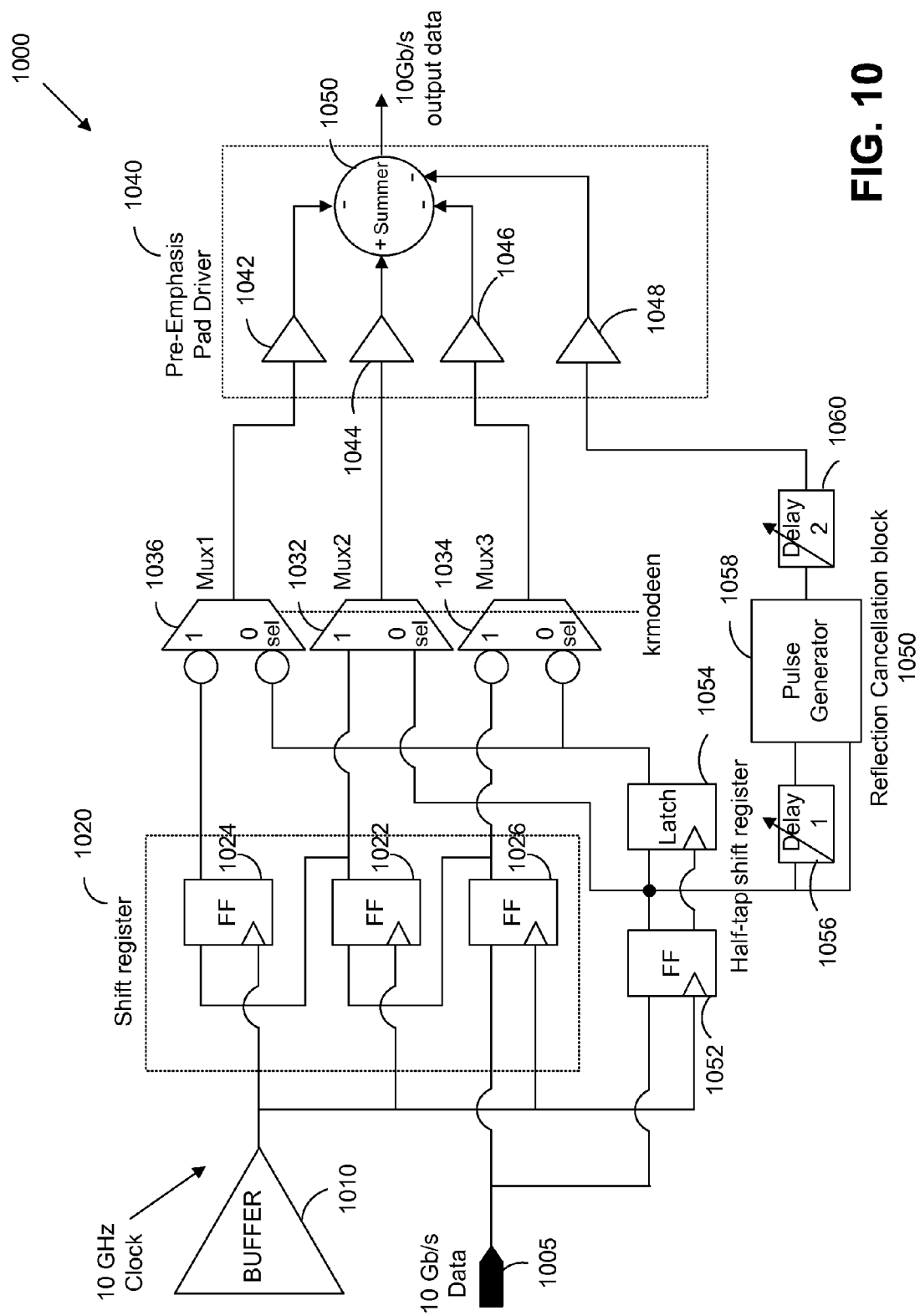
FIG. 10 illustrates one embodiment for a multi-mode circuit that includes both a half-tap FIR circuit and a full-tap FIR circuit.

Full-Tap & Half-Tap FIR Filtering (Multi-Mode Integrated Circuit):

FIG. 10 illustrates one embodiment for a multi-mode circuit that includes both a half-tap FIR circuit and a full-tap FIR circuit. For some embodiments, circuit 1000 may operate in different modes. For example, for this embodiment, when circuit 1000 is enabled in KR mode, then the full-tap FIR circuit is enabled and the half-tap FIR circuit is disabled or powered down. Alternatively, when circuit 1000 is enabled in SPF+ mode, then the full-tap FIR circuit is disabled and the half-tap FIR circuit is enabled.

As shown in FIG. 10, when the full-tap FIR circuit is enabled, a clock (e.g., 10 GHz clock) is output from buffer (1010) to shift register 1020. Specifically, the 10 GHz clock is input to the clock inputs of flip-flops 1024, 1022 and 1026. The input data stream (10 Gb/s) is input to the first flip-flop (1026) of the shift register 1020. The output of flip-flop 1026, which comprises the input data shifted one clock cycle, is negated and then input to multiplexer ("MUX") 1034 as the pre-cursor data signal. Also, the output data signal from flip-flop 1026 is the input data signal to flip-flop 1022. The output of flip-flop 1022, which comprises the data input one clock cycle prior, is input to MUX 1032 and is designated as the main data signal. In addition, the data output of flip-flop 1022 is input to the data input of flip-flop 1024. The output of flip-flop 1024, which comprises its data input one clock cycle later, is negated and then input to MUX 1036 to generate the post cursor signal.

When the half-tap FIR circuit is enabled, a serial input data stream is input to flip-flop 1052 during each clock cycle. During the next clock cycle, the data output of flip-flop 1052 is input to latch 1054. In addition, the data output of flip-flop 1052 is input to reflection cancellation block 1050 that may comprise the delay1 1056, pulse generator 1058, and delay2 1060. As discussed above, reflection cancellation block 1050 generates a cancellation pulse signal to cancel a reflection pulse originating on the channel. The output of latch 1054, which outputs data to generate two post-cursor signals, is negated and input to MUXs 1034 and 1036.

As shown in FIG. 10, multiplexers 1034, 1032 and 1036 receive, as an input, a mode control signal (e.g., "krmodeen"). When the mode control signal is input to select KR mode, then the output of shift register 1020 (i.e., full-tap FIR circuit)

is output from the multiplexers (1034, 1032 and 1036). Alternatively, when the mode control signal selects SFP+ mode, the multiplexers (1034, 1032 and 1036) output signals from half-tap shift register 1430 (i.e., half-tap FIR circuit).

The pre and post cursor signals and main data signal are input to drivers (1042, 1046 and 1048), and subsequently input to summer circuit 1050. The output of reflection cancellation block 1050 is also input to summer circuit 1050. As shown in FIG. 10, summer circuit 1050 subtracts the cursor signals (i.e., pre and post cursor signals from the full-tab circuit or post cursor signals from the half-tab circuit) from the main signal to generate an output data stream. Also, summer circuit 1050 subtracts the reflection cancellation pulse to generate an output data stream. A pre-emphasis pad driver 1040 may comprise the drivers 1042, 1044, and 1046 and the summer circuit 1050.

Figure 11:
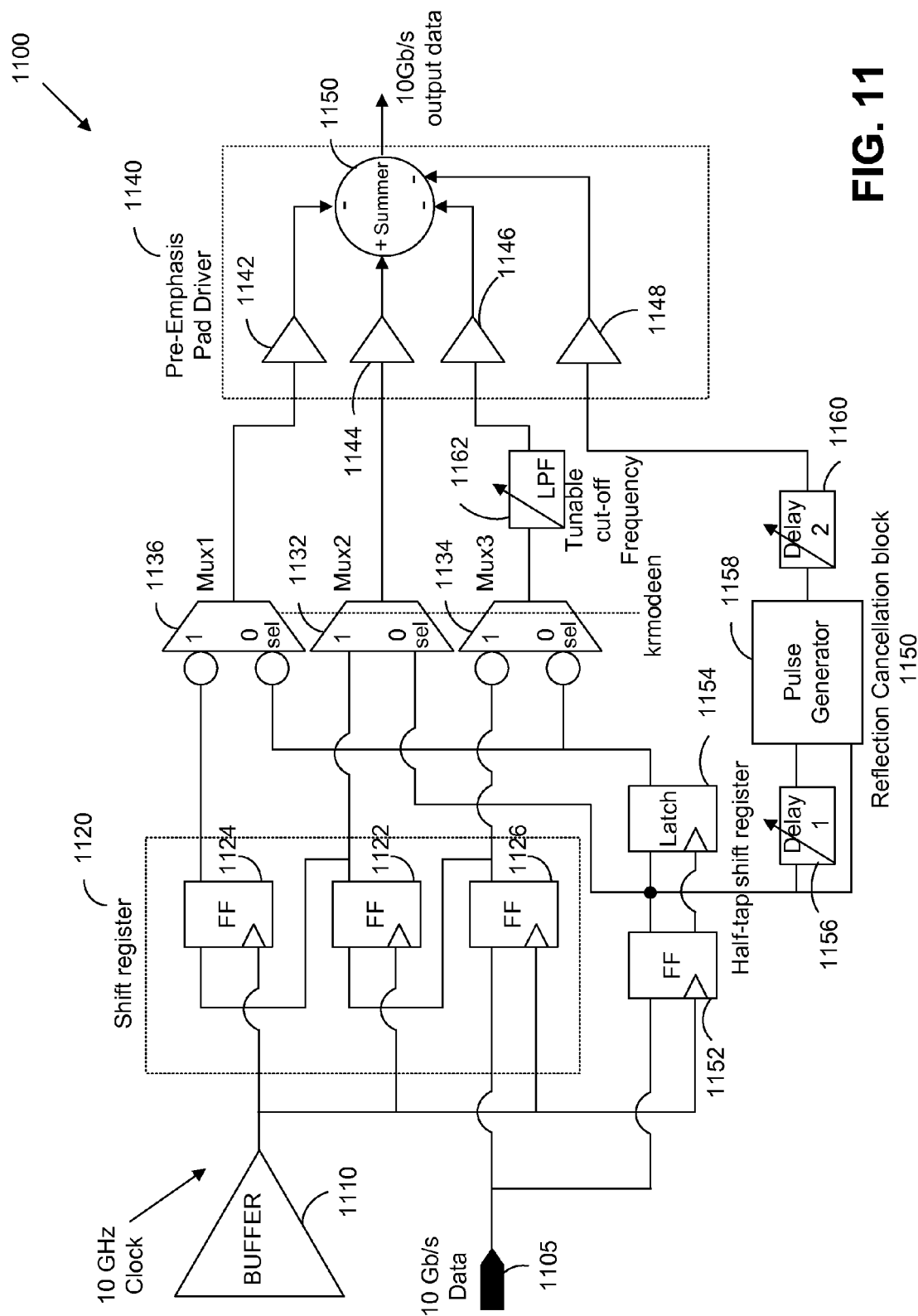
FIG. 11 illustrates one embodiment for a multi-mode transmitter circuit that incorporates filtering to cancel the second-pole effect introduced on the channel.

FIG. 11 illustrates one embodiment for a multi-mode transmitter circuit that incorporates filtering to cancel the second-pole effect introduced on the channel. For this embodiment, circuit 1100 may operate in different modes. For example, in some embodiments, circuit 1100 may operate in KR mode or operate in SFP+ mode. For this embodiment, when circuit 1100 operates in KR mode, then the full-tap FIR circuit is enabled. Alternatively, when circuit 1100 operates in SFP+ mode, then the half-tap FIR circuit is enabled.

As shown in FIG. 11, when the full-tap FIR circuit is enabled, a clock (e.g., 10 GHz clock) is output from buffer 1110 to shift register 1120. Specifically, the 10 GHz clock is input to the clock inputs of flip-flops 1124, 1122 and 1126. The input data stream (e.g., 10 Gb/s) is input to the first flip-flop 1126 of the shift register 1120. The output of flip-flop 1126, which comprises the input data shifted one clock cycle, is input to multiplexer 1134 as the pre-cursor data signal. Also, the output data signal from flip-flop 1126 is the input data signal to flip-flop 1122. The output of flip-flop 1122, which comprises the data input one clock cycle prior, is input to multiplexer 1132, and is designated as the main data signal. In addition, the data output of flip-flop 1122 is input to the data input of flip-flop 1124. The output of flip-flop 1124, which comprises its data input one clock cycle later, is input to multiplexer 1136 to generate the post cursor signal.

When circuit 1100 operates in SFP+ mode, then the clock, generated by buffer 1110, is input to the clock input of flip-flop 1152 and latch 1154. During each clock cycle, serial input data stream is input to flip-flop 1152. During the next clock cycle, the data output of flip-flop 1152 is input to latch 1154. In addition, the output of flip-flop 1152 is designated as the main data signal. Latch 1154 outputs data to generate two post-cursor signals.

As shown in FIG. 11, multiplexers 1134, 1132 and 1136 receive, as an input, a mode control signal. When the mode control signal is input to select KR mode, then the output of shift register 1120 (i.e., full-tap FIR circuit) is selected from the multiplexers (1124, 1122 and 1126). Alternatively, when the mode control selects SFP+ mode, the multiplexers (1134, 1132 and 1136) select signals from a half-tap shift register (i.e., half-tap FIR circuit).

A low-pass filter (LPF) 1162 (e.g., with a tunable cut-off frequency) is coupled between the multiplexer 1134 and driver 1146. When KR mode is selected, the full-tap pre-cursor signal is filtered in LPF 1162. Alternatively, when SFP+ mode is selected, the half-tap post-cursor signal is filtered in LPF 1162. One embodiment for LPF 1162 is described in conjunction with FIG. 11. Also, LPF 1162 may be programmable to select a cut-off frequency to set the response characteristics of the filter for the appropriate data rate (See, e.g., Table 1). The filtered full-tap pre-cursor signal (KR mode) or filtered half-tab post-cursor signal (SPF+ mode) is input to driver 1146. Also, the post-cursor signal (KR or SPF+ modes) and main data signal are input to drivers (1142 and 1144) respectively, and subsequently input to summer circuit 1150. As shown in FIG. 11, summer circuit 1150 subtracts the pre and post cursor signals (i.e., pre and post cursor signals from the full-tab circuit or post cursor signals from the half-tab circuit) from the main signal to generate an output data stream. Also, summer circuit 1150 subtracts the reflection cancellation pulse, as output by driver 1148, to generate an output data stream. A pre-emphasis pad driver 1140 may comprise the drives 1142, 1144, and 1146 and the summer circuit 1150.

In some embodiments, the LPF 1162 is programmable in order to program the filter to a cut-off frequency suitable for the data rate of the output serial data stream. In some embodiments for the programmable LPF 1162, switches (e.g., MOS transistors) are used to add capacitance, in parallel, to a series resistance as necessary to tune the filter for a particular cutoff frequency.

Figure 12:
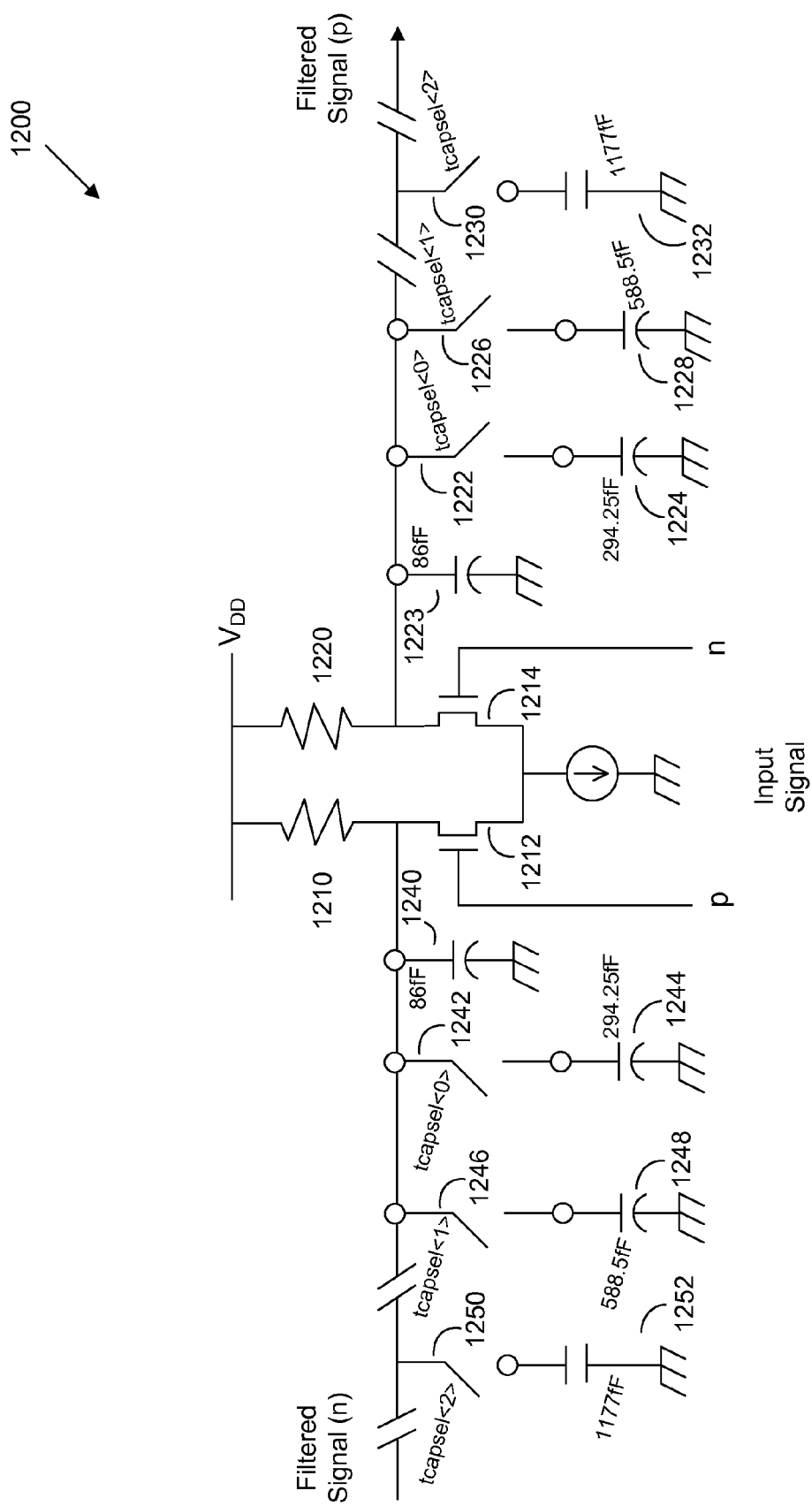
FIG. 12 illustrates a circuit for a programmable filter in accordance with some embodiments.

FIG. 12 illustrates a circuit for a programmable filter 1200, which is an example of LPF 1126, in accordance with some embodiments. In some embodiments, as described below, a pre-cursor signal, shifted at least a partial period of the clock from a main data signal, is input to the low pass filter. For the embodiment shown in FIG. 12, an RC filter is used to implement the low pass filter function.

As shown in FIG. 12, a signal (e.g., input signal "n" and "p"), generated in the transmitter, is input to RC filter 1200. The RC filter 1200 consists of resistors 1210 and 1220, respectively coupled in series with MOS transistors 1212 and 1214. A current source (e.g., 3 mA) sinks current from the transistors to ground. A capacitor 1223 is coupled in parallel with transistor 1214, and a capacitor 1240 is coupled in parallel with transistor 1212. In some embodiments, capacitors 1223 and 1240 have values of 86 femto-farads ("fF"). In order to change the cutoff frequency of the low pass response, one or more capacitors are selected to add additional capacitance, in parallel, to the output of the filter 1200. Specifically, capacitors 1244, 1248 and 1252 may be coupled to the output of filter 1200 via switches 1242, 1246 and 1250, and capacitors 1224, 1228 and 1232 may be coupled to the output of filter 1200 via switches 1222, 1226 and 1230. As shown in FIG. 12, switch pairs (1222 and 1242), (1226 and 1246) and (1250 and 1230) are controlled by signals tcapsel<0>, tcapsel<1> and tcapsel <2>, respectively. Although the RC filter is shown with three switches per side, any number of switches may be use to couple additional capacitors in parallel so as to increase the capacitance and/or to increase the granularity of the programmability of the RC filter.

Table 1 below illustrates selecting capacitors, through control signals tcapsel<2:0>, for a specified cut-off frequency and a specified mode.

TABLE 1

| Mode | tcapsel<2:0> | Cut_Off_Frequency |
| --- | --- | --- |
| SFP+ | 0, 0, 0 | 12.36 GHz |
| SFP+ | 0, 0, 1 | 3.22 GHz |
| SFP+ | 0, 1, 0 | 1.62 GHz |
| SFP+ | 0, 1, 1 | 1.00 GHz |
| SFP+ | 1, 0, 0 | 0.84 GHz |
| SFP+ | 1, 0, 1 | 0.66 GHz |
| SFP+ | 1, 1, 0 | 0.58 GHz |
| SFP+ | 1, 1, 1 | 0.50 GHz |
| KRMODE | 0, 0, 0 | 12.36 GHz |

Figure 13:
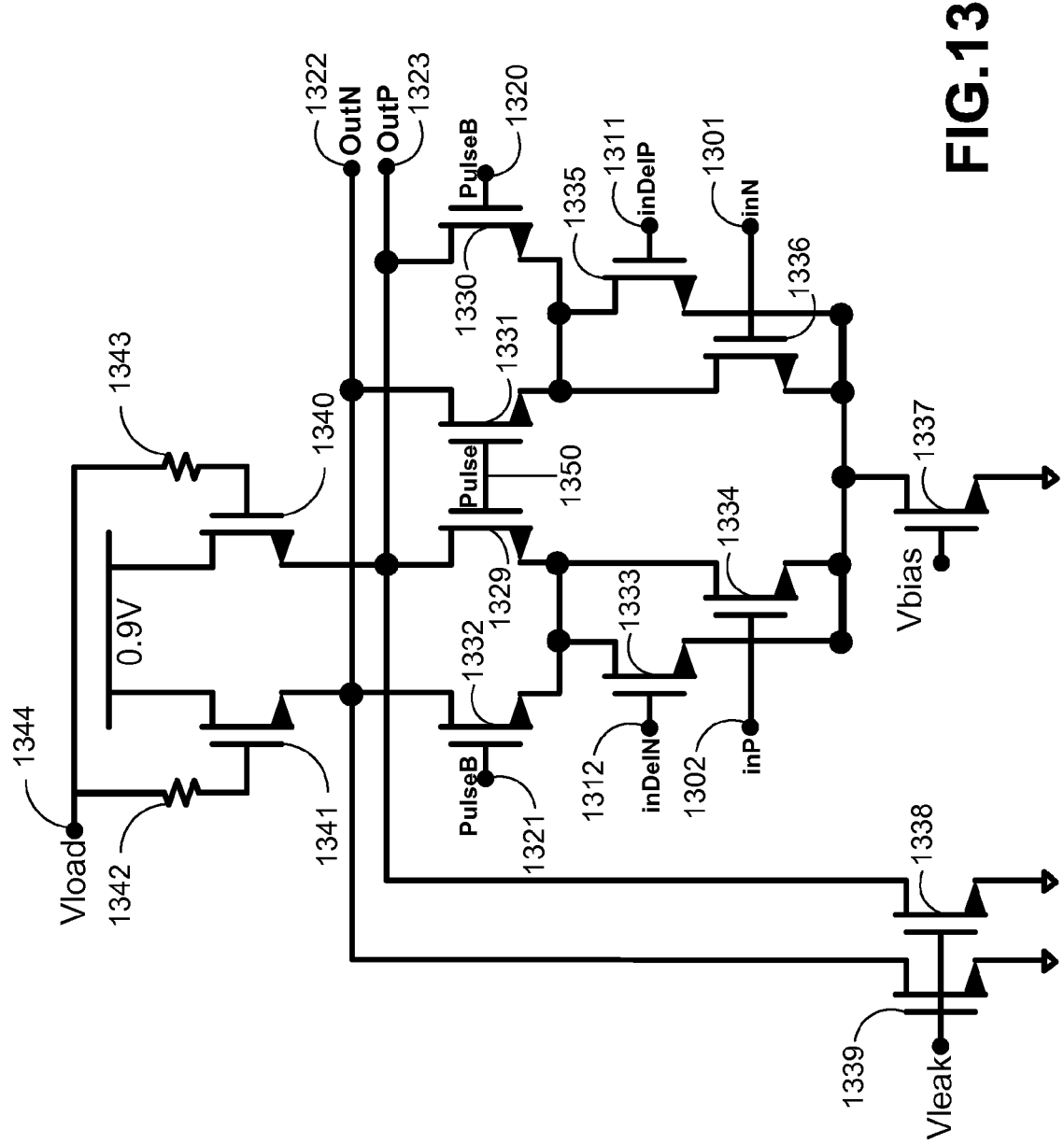
FIG. 13 illustrates a circuit for a pulse generator in accordance with some embodiments.

FIG. 13 illustrates an example circuit for a pulse generator 1300, which is an example of a pulse generator 558/858/958/1058/1158 used in accordance with some embodiments. In general, the pulse generator 1300 is comprised of transistors 1329 through 1339. The pulse generator 1300 may receive two inputs. For example, the pulse generator 1300 may receive an input 'in P' 1302 and an input 'in DelP' 1311. In some embodiments, the 'in DelP' input may comprise the output of the delay1 component as previously described. As such, 'in DelP' may be delayed with respect to the second input 'in P.' Similarly, the pulse generator 1300 receives complementary input signals 'in N' 1301 and 'in DelN' 1312. As such, the delayed input signal (e.g., 'in DelP' 1311 and 'in DelN' 1312) and the non-delayed input signal (e.g., 'in P' 1302 and 'in N' 1301) may declare the pulse width. In some embodiments, the pulse generator 1300 may produce an output signal 'OutP' 1323 as well as the complementary output signal 'OutN' 1322. As such, the pulse generator 1300 may generate the output signal 'OutP' 1323 to have a negative pulse if the pulse is a 0 and to have a positive pulse if the pulse is 1. The pulse generator 1300 may further comprise transistors 1340 and 1341 in conjunction with resistors 1342 and 1343 to produce an active peak shunt load.

FIG. 14 illustrates a block diagram 1400 of a reflection cancellation block (e.g., 430, 550, 850, 950, 1050, 1150) used in accordance with some embodiments. The delay2 component 1410, which is an example of delay2 556 (FIG. 5), may comprise latches 1411 and 1412. The data input of latch 1411 may comprise a serial data input and the output of latch 1411 may be coupled to the data input of latch 1412. Sign select buffers 1413 and 1414 may be coupled to the clock enable bits of the latches 1411 and 1412. For example, the output of sign select buffer 1413 may be coupled to the clock enable of latch 1411 and the output of sign select buffer 1414 may be coupled to the clock enable of latch 1412. The delay2 component may provide a delay of one to two unit intervals in some embodiments. For example, if the sign selection input of sign select buffer 1413 comprises a '0' and the sign selection input of sign select buffer 1414 comprises a '0', then the output pulse may be delayed by 1.5 unit intervals. In some embodiments, if the sign selection input of sign select buffer 1413 comprises a '0' and the sign selection input of sign select buffer 1414 comprises a '1', then the output pulse may be delayed by 1.0 unit intervals. If the sign selection input of sign select buffer 1413 comprises a '1' and the sign selection input of sign select buffer 1414 comprises a '0', then the output pulse may be delayed by 2.0 unit intervals. In some embodiments, if the sign selection input of sign select buffer 1413 comprises a '1' and the sign selection input of sign select buffer 1414 comprises a '1', then the output pulse may be delayed by 1.5 unit intervals.

In some embodiments, the delay1 component 1420 may be comprised of a latch. As such, the delay1 component 1420 may provide a pulse width of one half of a unit interval. Pulse generator 1421, which is an example of pulse generator 558/858/958/1058/1158, receives the output of latch 1412 and the output of delay1 component 1420 and generates a positive or negative pulse.

Application Embodiments

Figure 15:
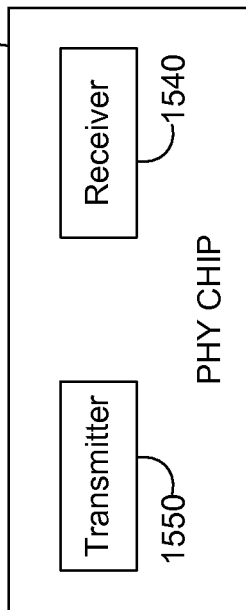
FIG. 15 is a block diagram that illustrates one embodiment for implementing the phase inversion systems, circuits, and methods on a single integrated circuit ("IC").

The systems, circuits, and methods disclosed herein may be implemented on one or more integrated circuits. FIG. 15 is a block diagram illustrating one embodiment for implementing the systems, circuits, and methods on a single integrated circuit. In some embodiments, a physical layer ("PHY") integrated circuit 1520 is used to define electrical and physical specifications for a communications device 1510. As such, the PHY integrated circuit 1520 may define the relationship between the communications device 1510 and a transmission medium 1530. The PHY integrated circuit 1520 may include the basic hardware transmission technologies of a network and provide related functions and services. For example, the PHY integrated circuit may, but is not limited to, establish and terminate a connection to a transmission medium 1530, modulate or convert between the representation of digital data used in the communications device 1510 and the corresponding signals transmitted over the transmission medium 1530, providing a standardized interface to the transmission medium 1530, by line coding, bit synchronization, circuit switching, multiplexing, forward error correction, and/or bit-interleaving.

In some embodiments, the PHY integrated circuit 1520 may consist of a transmitter 1550 and a receiver 1540. In general, the transmitter 1550 may modulate and condition data streams for transmission over a transmission medium 1530 and the receiver 1540 may modulate and condition data streams transmitted to the receiver 1540 over a transmission medium 1530. In some embodiments, the transmitter 1550 and/or the receiver 1540 may comprise the systems, methods, and circuits discussed above. In the same or alternative embodiments, the transmitter 1550 and/or receiver 1540 may comprise the method discussed with relation to FIG. 7. In some embodiments, the PHY integrated circuit 1520 may operate as a transceiver such that the circuit both transmits data over the transmission medium 1530 and receives data from the transmission medium 1530. However, in some embodiments, each of the receiver 1540 and the transmitter 1550 may be implemented as a single integrated circuit. As such, the PHY integrated circuit 1520 may be implemented in the form of a plurality of integrated circuits. Moreover, the transmitter 1550 and/or the receiver 1540 may each comprise IP blocks for incorporation into one or more integrated circuits. Although the PHY integrated circuit 1520 has been discussed with relation to the transmitter 1550 and receiver 1540, it should be appreciated that the PHY integrated circuit 1520 may comprise other hardware components, logical blocks, or integrated circuits that may implement the systems, methods, and circuits disclosed herein. As such, the PHY integrated circuit 1520 may comprise any combination or number of receivers 1540, transmitters 1550, hardware components, logical blocks, and/or integrated circuits.

The transmission medium 1530 may transmit and receive data to and from the PHY integrated circuit 1520 in order to facilitate data communication over a network. Examples of a transmission medium may comprise, but are not limited to, metallic (e.g., copper) cables, fiber optic cables, and a wireless network. In some embodiments, if a metallic cable is used as the transmission medium 1530, then the PHY integrated circuit 1520 may convert data transmitted to the transmission medium 1530 into electrical signals. In other embodiments, if a fiber optical cable is used as the transmission medium 1530, then the PHY integrated circuit 1520 may convert data transmitted to the transmission medium 1530 into luminous signals. Similarly, in some embodiments, if a wireless network is used as the transmission medium 1530, then the PHY integrated circuit 1520 may convert data transmitted to the transmission medium 1530 into electromagnetic signals. As such, in some embodiments, the PHY integrated circuit 1520 receives data for transmission to the transmission medium 1530 and converts the data into signals representing binary 0's and 1's. This converted data may then be received by another component comprised within communications device 1510.

The PHY integrated circuit 1520 may be configured to function with relation to a variety of protocols used by the communications device 1510. For example, the PHY Integrated circuit 1520 may be configured to function with regard to an IEEE 802.3 standard such as a 10 Gigabit Ethernet (10 GigE) standard. The PHY integrated circuit 1520 may be configured to function in conjunction with other protocols. Examples of such protocols may comprise, but are not limited to, Synchronous Optical Networking (SONET)/Synchronous Digital Hierarchy (SDH), V.92 for telephone network modems, Infrared Data Association (IrDA) Physical Layer, Universal Serial Bus (USB) Physical Layer, Recommended Standard 232 (RS-232), RS-422, RS-423, RS-449, RS-485, Ethernet Physical Layer (10Base-T, 10BASE2, 100BASE-TX, 10 GigE, etc.), 802.11 Wi-Fi Physical Layers, Digital Subscriber Line (DSL), Integrated Services Digital Network (ISDN), Optical Transport Network (OTN), Bluetooth Physical Layer, and Firewire.

In some embodiments, the PHY integrated circuit 1520 may receive data or a request from another hardware component or software module within the communications device 1510. A software module or hardware component operating at a Data Link Layer may transmit data and/or requests to the PHY integrated circuit 1520. For example, the PHY integrated circuit 1520 may translate logical communication requests from the software module or component operating at a Data Link Layer into hardware specific operations that may affect the transmission or reception of electronic signals over the transmission medium 1530. As such, in some embodiments, the PHY integrated circuit 1520 may communicate and interact with software modules or another component operating at another portion or layer of a communications system. For example, the PHY integrated circuit 1520 may communicate with another software module or another hardware component operating within the Physical Layer, Data Link Layer, Network Layer, Transport Layer, Session Layer, Presentation Layer, and/or Application Layer. As such, the PHY integrated circuit 1520 may be comprised within a communications device 1510 that may also comprise other software modules or hardware components that directly or indirectly communicate with the PHY integrated circuit 1520.

As a result, in some embodiments, the PHY integrated circuit 1520 may receive data from a transmission medium 1530. The PHY integrated circuit 1520 may convert the data and the resulting converted data may be used by other software modules or hardware components within the communications device 1510 or in a separate communications device.

The communications device 1510 may comprise a hardware component configured to operate within a network environment. Examples of a communications device 1510 that may comprise the PHY integrated circuit 1520 are, but are not limited to, a network adapter, network interface controller (NIC), repeater, network hub, switch, router, modem, USB controller, Serial ATA controller, memory (e.g., SDRAM or flash) chip interface, transceiver, or a host bus adapter (HBA). The communications device 1510 may comprise, but is not limited to, components of an optical fiber network, such as those components mentioned earlier or a fiber media converter, an add-drop multiplexer (ADM), reconfigurable optical add-drop multiplexers (ROADMs), a regenerator, or a digital cross connect system (DCS). As such, the communications device 1510 may comprise at least one hardware component configured to operate within a network environment.

Figure 16:
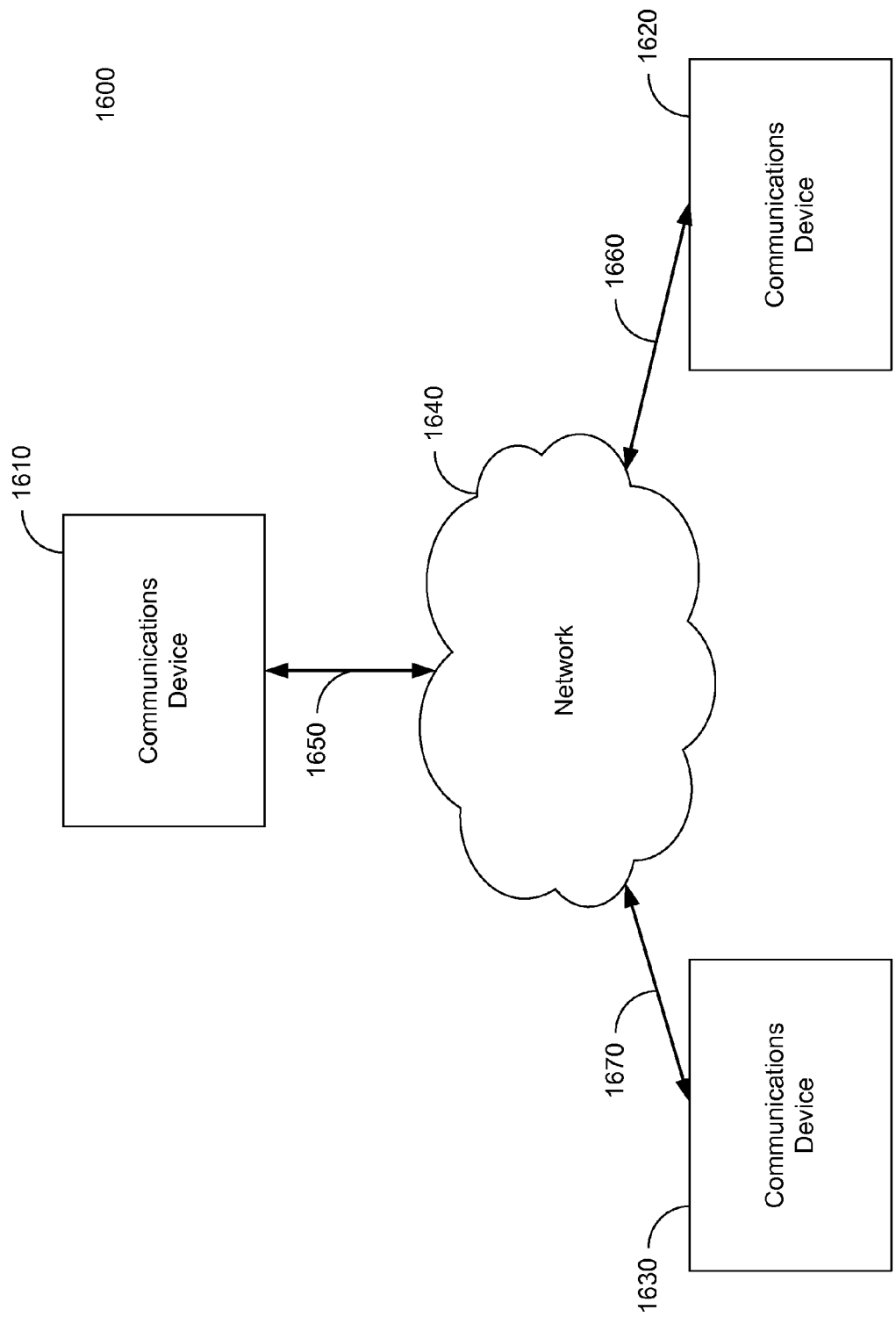
FIG. 16 is a block diagram illustrating one embodiment of a network system that incorporates the phase inversion systems, circuits, and methods.

FIG. 16 is a block diagram illustrating an example embodiment of a network system 1100 that may incorporate the systems, circuits, and methods disclosed herein. In some embodiments, one or more communication devices 1610, 1620, and 1630 are coupled to a network 1640 by a transmission medium 1650, 1660, or 1670. In some embodiments, the communication device 1610 may comprise a router coupled to one or more computer devices (not shown) such that the computers are coupled to the network 1640 by means of the router. The router may incorporate one or more PHY integrated circuits 1520. In turn, the PHY integrated circuits may incorporate a receiver and/or a transmitter. In some embodiments, the PHY integrated circuits comprise, at least in part, the various components discussed above. In other embodiments, the PHY integrated circuits comprise, at least in part, the method of FIG. 7.

In operation, the router 1610 may use a PHY integrated circuit 1520 to transmit data to communications device 1630. As such, the PHY integrated circuit 1520 may be enabled to transmit data from the communication device 1610 over the transmission medium 1650, through the network 1640, and over transmission medium 1660 to communications device 1620. The communications device 1620 may also comprise a PHY integrated circuit 1520 that is configured to receive data over the transmission medium 1660.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary non-transitory storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present circuits, systems, and methods. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

Although the present circuits, systems, and methods have been described in terms of specific exemplary embodiments, it will be appreciated that various modifications and alterations might be made by those skilled in the art without departing from the spirit and scope of the disclosure.

What is claimed is:

1. A method for transmitting data across a channel, said method comprising:
    receiving a data signal for transmission over the channel that couples a source to a destination;
    detecting, at said source, an approximate data transition point of said data signal;
    determining characteristics of a reflected pulse signal generated from said channel during said data transition point of said data signal;
    generating a compensation pulse signal comprising said characteristics of said reflected pulse signal with a magnitude substantially opposite from said reflected pulse signal, wherein generating said compensation pulse signal includes determining a sign of an amplitude of the compensation pulse signal based on a rising edge or a falling edge of said data signal;
    combining said compensation pulse signal with said data signal to generate an output signal; and
    transmitting said output signal on said channel, so as to substantially cancel said reflected pulse signal during said data transition point at said destination.

2. The method as set forth in claim 1, wherein determining characteristics of said reflected pulse signal comprises:
    determining an approximate time required for said reflected pulse signal to travel from said source to said destination;
    determining an approximate amplitude of said reflected pulse signal;
    determining an approximate width of said reflected pulse signal; and
    determining whether said reflected pulse signal corresponds to said rising edge or said falling edge of said data signal.

3. The method as set forth in claim 1, wherein generating the compensation pulse signal further comprises:
    generating a first delay to generate a pulse width of said compensation pulse signal in accordance with an approximate pulse width of said reflected pulse signal.

4. The method as set forth in claim 3, wherein generating the compensation pulse signal further comprises:
    generating a second delay to control a time delay between said data signal and said compensation pulse signal based on a time of flight for travel of said reflected pulse signal over said channel.

5. The method as set forth in claim 1, wherein generating the compensation pulse signal further comprises:
    adjusting said amplitude of said compensation pulse signal in accordance with an approximate amplitude of said reflected pulse signal.

6. The method as set forth in claim 1, wherein detecting the approximate data transition point in said data signal comprises:
    receiving said data signal shifted approximately one half clock period.

7. A method for transmitting data across a channel, said method comprising:
    receiving a data signal for transmission over the channel that couples a source to a destination;
    detecting, at said source, an approximate data transition point of said data signal;
    determining characteristics of a reflected pulse signal generated from said channel during said data transition point of said data signal;
    generating a compensation pulse signal comprising said characteristics of said reflected pulse signal with a magnitude substantially, opposite from said reflected pulse signal, including:
        detecting a rising edge or a falling edge of said data signal;
        generating, as said compensation pulse signal, a positive compensation pulse signal when the rising edge of said data signal is detected; and
        generating, as said compensation pulse signal, a negative compensation pulse signal when the falling edge of said data signal is detected;
    combining said compensation pulse signal with said data signal to generate an output signal; and
    transmitting said output signal on said channel, so as to substantially cancel said reflected pulse signal during said data transition point at said destination.

8. A circuit for transmitting a data signal over a channel, said circuit comprising:
    a flip-flop configured to receive the data signal and to generate an output signal;
    a reflection cancellation circuit configured to generate a compensation pulse signal substantially to cancel a reflected pulse signal arising on said channel, said reflection cancellation circuit comprising:
    a first delay element, coupled to receive said data signal from said flip-flop, configured to generate a delay approximately equal to a pulse width of said reflected pulse signal;
    a pulse generator, coupled to receive said data signal, configured to generate a compensation pulse signal with an edge opposite of said reflected pulse signal; and
    a second delay element, configured to control a time delay between said data signal and said compensation pulse signal based on a time of flight for travel of said reflected pulse signal over said channel.

9. The circuit as set forth in claim 8, further comprising a summer circuit configured to combine said compensation pulse signal with said data signal to generate the output signal, and to transmit said output signal on said channel, so as to cancel said reflected pulse signal during a data transition point at a destination.

10. The circuit as set forth in claim 8, wherein said pulse generator comprises a circuit configured to detect a rising edge or a falling edge of said data signal and to generate, as said compensation pulse signal, a positive compensation pulse signal when the rising edge of said signal is detected, and to generate, as said compensation pulse signal, a negative compensation pulse signal when the falling edge of said signal is detected.

11. The circuit as set forth in claim 8, further comprising a pad driver circuit configured to adjust an amplitude of said compensation pulse signal in accordance with an approximate amplitude of said reflected pulse signal.

12. The circuit as set forth in claim 8, wherein said flip-flop is configured to generate said output signal approximately one half period after receiving said data signal.

13. A circuit for transmitting a data signal over a channel, comprising:
- a main signal conditioning circuit configured to receive the data signal and to generate a pre-cursor signal;
- a reflection cancellation circuit configured to receive said data signal and to generate a compensation pulse signal comprising approximate characteristics of a reflected pulse signal with a magnitude opposite from said reflected pulse signal, wherein said reflected pulse signal is generated from imperfections in said channel and a sign of an amplitude of said compensation pulse signal is based on, a rising edge or a falling edge of said data signal; and
- a summer circuit configured to combine said pre-cursor signal and said compensation pulse signal to said data signal to generate an output data signal for transmission over said channel.

14. The circuit as set forth in claim 13, said main signal conditioning circuit comprising:
- a filter circuit configuted to filter said pre-cursor signal.

15. The circuit as set forth in claim 13, wherein:
- said main signal conditioning circuit comprises a half-tap shift register circuit configured to receive said data signal and to shift said data signal less than a full clock cycle relative to said data signal to generate at least one post cursor signal; and
- said summer circuit is further configured to subtract said post cursor signal from said data signal to generate said output data signal.

16. The circuit as set forth in claim 13, wherein:
- said main signal conditioning circuit comprises:
  - a shift register circuit configured to receive a clock and said data signal, and to shift said data signal, in accordance with clock cycles of said clock, to generate a main data signal,
  - a full tap pre-cursor signal shifted one prior clock cycle relative to said main data signal, and
  - a full tap post cursor signal shifted one subsequent clock cycle relative to said main data signal; and
- said summer circuit is further configured to subtract said pre-cursor signal and said cursor signal from said main data signal to generate said output data signal.

17. The circuit as set forth in claim 13, wherein:
- said main signal conditioning circuit comprises:
  - a shift register circuit configured to receive a clock and an input data stream, and to shift said input data stream, in accordance with clock cycles of said clock, to generate a main data signal,
  - a full tap pre cursor signal shifted one prior clock cycle relative to said main data signal, and
  - a full tap post cursor signal shifted one subsequent clock cycle relative to said main data signal;
  - a half-tap shift register circuit configured to receive the clock and the input data stream, and to shift said input data stream less than a full clock cycle relative to the main data signal to generate at least one half-tap post cursor signal;
- a multiplexor circuit, coupled to said shift register circuit and said half-tap shift register circuit, configured to receive said main data signal, said fall tap pre cursor signal, said full tap post cursor signal and at least one half-tap post cursor signal, and to select said main data signal, said full tap pre cursor signal and said full tap post cursor signal for operation in a first mode, and to select said main data signal and at least one half-tap post cursor signal for operation in a second mode; and
- said summer circuit, coupled to said multiplexor circuit, further configured to subtract said full tap pre cursor signal and said full tap post cursor signal from said main data signal for operation in said first mode, and to subtract said at least one half-tap post cursor signal from said main data signal for operation in said second mode.

18. A circuit for transmitting a data signal over a channel, comprising:
- a main signal conditioning circuit configured to receive the data signal and to generate a pre-cursor signal;
- a reflection cancellation circuit configured to receive said data signal and to generate a compensation pulse signal comprising approximate characteristics of a reflected pulse signal with a magnitude opposite from said reflected pulse signal, wherein said reflected pulse signal is generated from imperfections in said channel; and
- a summer circuit configured to combine said pre-cursor signal and said compensation pulse signal to said data signal to generate an output data signal for transmission over said channel,
- wherein said reflection cancellation circuit comprises a pulse generator configured to detect a rising edge or a falling edge of said data signal and to generate, as said compensation pulse signal, a positive compensation pulse signal when the rising edge of said data signal is detected, and a negative compensation pulse signal when the falling edge of said data signal is detected.

19. The circuit as set forth in claim 13, further comprising a pad driver circuit configured to adjust said amplitude of said compensation pulse signal in accordance with an approximate amplitude of said reflected pulse signal.

20. The circuit as set forth in claim 13, wherein said reflection cancellation circuit comprises a first delay element configured to generate a first delay to generate a pulse width of said compensation pulse signal in accordance with an approximate pulse width of said reflected pulse signal.

21. The circuit as set forth in claim 20, wherein said reflection cancellation circuit comprises a second delay element configured to generate a second delay to control a time delay between said data signal and said compensation pulse signal based on a time of flight for travel of said reflected pulse signal over said channel.

* * * * *

UNITED STATES PATENT AND TRADEMARK OFFICE
CERTIFICATE OF CORRECTION

PATENT NO.           : 8,737,492 B1
APPLICATION NO.      : 13/182379
DATED                : May 27, 2014
INVENTOR(S)          : Halil Cirit Page 1 of 1

It is certified that error appears in the above-identified patent and that said Letters Patent is hereby corrected as shown below:

In the Claims

Column 14, Claim 7, line 23, please replace "substantially, opposite from" with --substantially opposite from--.

Column 15, Claim 13, line 22, please replace "based on, a rising edge" with --based on a rising edge--.

Signed and Sealed this
Fifth Day of August, 2014

Michelle K. Lee
*Deputy Director of the United States Patent and Trademark Office*